(No Model.)
S. T. STREET.
GATE FOR RAILWAY CROSSINGS.
No. 380,228. Patented Mar. 27, 1888.
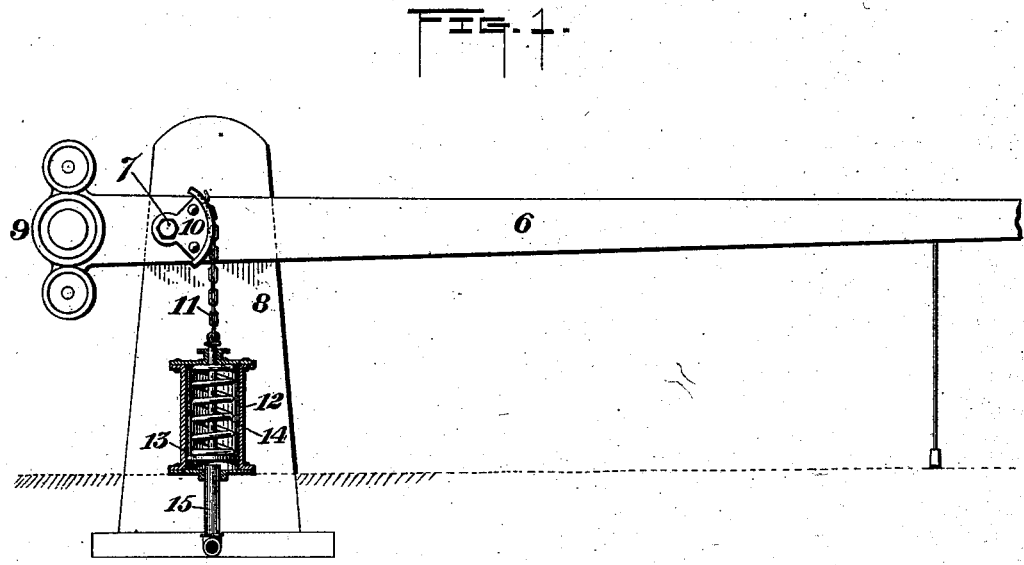
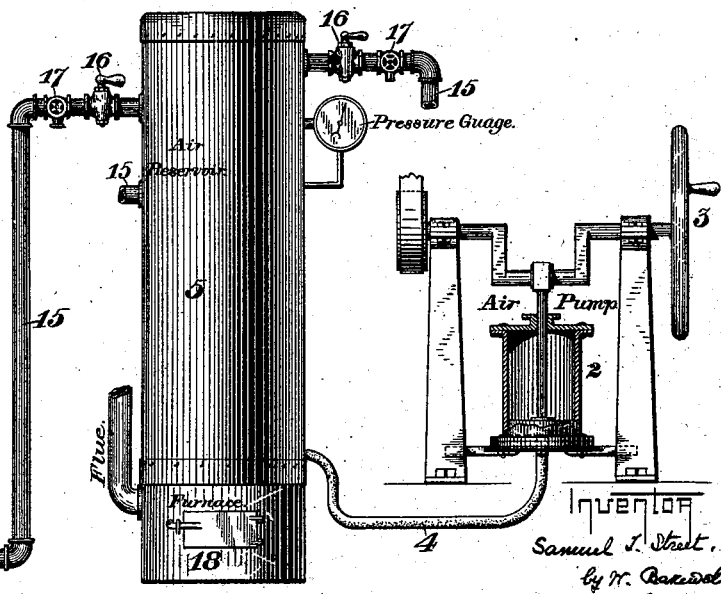

UNITED STATES PATENT OFFICE.

SAMUEL T. STREET, OF DEPOSIT, NEW YORK.

GATE FOR RAILWAY-CROSSINGS.

SPECIFICATION forming part of Letters Patent No. 380,228, dated March 27, 1888.

Application filed November 11, 1887. Serial No. 254,880. (No model.)

*To all whom it may concern:*

Be it known that I, SAMUEL T. STREET, of Deposit, in the county of Broome and State of New York, have invented a new and useful Improvement in Gates for Railway-Crossings; and I do hereby declare the following to be a full, clear, and exact description thereof, reference being had to the accompanying drawings, forming part of this specification, in which—

Figure 1 is a side elevation of a railway-gate provided with my improvement, the actuating mechanism being shown in vertical section. Fig. 2 is a side view of the air-compressing device and reservoir.

Like symbols of reference indicate like parts in each.

My invention relates to an improvement in railway-gates of that class wherein the gates are operated by means of compressed air; and it consists in certain improved combinations and constructions of the parts, whereby the gates are made more certain and safer in their action than those heretofore known.

Instead of having the gates actuated by a positive force of the pneumatic-power devices in both directions, I arrange the parts and connect the compressed-air supply with the actuating-cylinder of the gate in such manner that when the compressed air is admitted to the cylinder it shall compress a spring, (which, when unrestrained, pulls on the gate and holds it in a horizontal position,) thus relieving the gate of the force of the spring and allowing it to be raised into an upright position by means of a suitable counter-balance. In order to bring the gate again into a horizontal position, the connection between the compressed-air reservoir and the power-cylinder is cut off and the air allowed to escape from the latter. This leaves the spring free to act, and it accordingly draws the gate down into the proper position.

Referring now to the drawings, 2 represents the cylinder of a suitable air-compression pump, and 3 represents the power-wheel by which the piston of the air-pump is driven. This pump is located at a point convenient for the operator, and is connected by means of the pipe 4 with a compressed-air receiver or tank 5.

6 represents the arm of an ordinary safety-gate, which is pivoted at a point, 7, to an upright or standard, 8, and has at its short end a suitable counter-balance, 9. This gate, when in position to obstruct the highway, is in a horizontal position, as shown in Fig. 1. Fixed to the shaft 7, on which the gate is mounted, is a quadrant or segment of a wheel, 10, to a hook at the upper end of which is fastened a chain, 11, as will be readily understood.

12 is an air-cylinder, having within it a piston, 13, whose rod or stem is fastened to the chain 11. A spring, 14, within the cylinder 12 bears on the piston 13 and tends to force it down. The advantage of the segment 10 is that it causes the spring 14 to exert its force on the gate constantly in a straight line. This prevents torsion of the parts and makes the apparatus much more efficient and durable. Instead of using the spring 14 to bear on the piston, a suitable weight may be employed for the same purpose. The lower end of the cylinder 12 is connected by means of a suitable pipe, 15, with the compressed-air receiver 5. This pipe 15 is provided with a throttle-valve, 16, and an exhaust-valve, 17, between the throttle-valve and the cylinder 12.

The operation of the parts is as follows: In order to raise the gate into a vertical position, the cylinder 5 is first charged with compressed air—say at a tension of two atmospheres or more; then the exhaust-valve 17 is closed and the valve 16 is opened, so as to admit air from the receiver 5 into the cylinder 12. This raises the piston 13, and, relieving the tension of the spring 14 on the gate 6, allows the counter-balance 9 to raise the gate into an upright position. In order to lower the gate, the operator closes the valve 16 and opens the exhaust-valve 17. The air then escapes from the cylinder 12 beneath the piston 13, allowing the spring 14 to press down the piston 13, which draws with it the gate. When there are two gates across a single street or highway, they may be connected by suitable power mechanism, so that the motion of one gate shall operate the other, or each gate may have a separate air-cylinder and piston. By means of this mechanism the gates may be operated by a man stationed at a suitable distance from them, and by having a number of air-conveying pipes 15 leading from a single air-receiver, and each provided with valves located at a central station, a single operator can control the gates of a great number of streets. In large cities this is a feature of very great importance. Instead of having separate valves 16 and 17 in the pipe 15, a single three-way cock or valve may be employed, and other modifications which will suggest themselves to the skilled mechanic may be made. In cold weather, where it might under some circumstances be difficult to secure proper action of the parts, it may be desirable to heat the air which I use as a motive power. I have provided means for doing this by locating a small furnace, 18, beneath the air-receiver. This furnace may be supplied with fuel, and when ignited will keep the air at the proper temperature. The furnace may be located at any other suitable place where it will heat the air.

The advantages of my invention are its great simplicity of construction and operation and its certainty of action. The parts are not liable to stick and cannot easily get out of order.

I am aware that a gate mechanism has been patented wherein a hydraulically-actuated piston tends to depress the gates into a horizontal position and gravity is used to raise them. This plan is, however, objectionable, because the gate is not put under perfect control of the operator, who is not able, in case of necessity, to check the descent of the gates as suddenly as he should.

I claim—

1. In a gate mechanism, the combination, with a vertically-moving gate, of a spring or weight which tends to draw the gate downward into a horizontal position, and a piston which works in the opposite direction to effect the rise of the gate, substantially as and for the purposes described.

2. In a gate mechanism, the combination, with the gate, of a spring or weight which tends to draw the gate into a horizontal position, and which is connected with the gate by a segment of a wheel and a chain, and a pneumatic piston which bears against the spring or weight, the gate being counterbalanced, whereby when the force of the weight or spring is relieved by means of the pneumatic piston the gate will open, substantially as and for the purposes described.

3. In a gate mechanism, the combination, with the gate, of a spring or weight which tends to draw the gate into a horizontal position, a single-acting pneumatic piston which bears against the spring or weight, a compressed-air reservoir communicating therewith, a valve for opening and closing connection between the reservoir and the cylinder, and an exhaust-valve, said gate being counterbalanced, whereby when the force of the weight or spring is relieved by means of the pneumatic piston the gate will open, and when the piston is cut off from the compressed-air supply and the exhaust-valve opened the gate will close, substantially as and for the purposes described.

In testimony whereof I have hereunto set my hand this 31st day of October, A. D. 1887.

SAMUEL T. STREET.

Witnesses:
H. W. KNAPP,
W. K. DE WITT.